US009032061B1

(12) United States Patent
Xin et al.

(10) Patent No.: US 9,032,061 B1
(45) Date of Patent: May 12, 2015

(54) POLICY BASED INTELLIGENT DATA PLACEMENT

(75) Inventors: Qin Xin, Broken Arrow, OK (US); Feng Zhang, Sherborn, MA (US); Qi Bao, Boxborough, MA (US)

(73) Assignee: EMC Corporation, Hopkinton, MA (US)

( * ) Notice: Subject to any disclaimer, the term of this patent is extended or adjusted under 35 U.S.C. 154(b) by 403 days.

(21) Appl. No.: 13/398,163

(22) Filed: Feb. 16, 2012

Related U.S. Application Data (60) Provisional application No. 61/582,125, filed on Dec. 30, 2011.

(51) Int. Cl.
*G06F 15/173* (2006.01)
*H04L 12/28* (2006.01)

(52) U.S. Cl.
CPC ................................. *H04L 12/283* (2013.01)

(58) Field of Classification Search
CPC ........ G06F 15/173–15/17393; G06F 11/1446; G06F 11/2094; G06F 11/30212; H04L 41/08
USPC .......................................................... 709/223
See application file for complete search history.

(56) References Cited

U.S. PATENT DOCUMENTS

| | | | |
|---|---|---|---|
| 6,985,956 B2 | 1/2006 | Luke et al. | |
| 7,089,293 B2 | 8/2006 | Grosner et al. | |
| 7,313,614 B2 | 12/2007 | Considine et al. | |
| 7,865,596 B2 | 1/2011 | Grosner et al. | |
| 7,958,199 B2 | 6/2011 | Ferrari et al. | |
| 8,095,601 B2 | 1/2012 | Hasha et al. | |
| 8,327,080 B1 * | 12/2012 | Der | 711/143 |
| 8,341,363 B2 * | 12/2012 | Chou et al. | 711/162 |
| 8,429,630 B2 | 4/2013 | Nickolov et al. | |
| 8,549,180 B2 | 10/2013 | Critchley et al. | |
| 8,560,639 B2 * | 10/2013 | Murphy et al. | 709/219 |
| 2005/0131900 A1 * | 6/2005 | Palliyll et al. | 707/10 |
| 2007/0028002 A1 | 2/2007 | McCanne | |
| 2007/0150784 A1 * | 6/2007 | Pan et al. | 714/746 |
| 2008/0008202 A1 | 1/2008 | Terrell et al. | |
| 2009/0089300 A1 | 4/2009 | Vicente | |

(Continued)

OTHER PUBLICATIONS

Aguilera et al., "Using Erasure Codes Efficiently for Storage in a Distributed Aystem", Proc. of the 2005 Int. Conf. on Dependable Systems and Networks (DSN'05), IEEE Computer Society, 2005.

(Continued)

*Primary Examiner* — Brian J Gillis
*Assistant Examiner* — Steve Lin
(74) *Attorney, Agent, or Firm* — BainwoodHuang (57) ABSTRACT

A technique performs policy-based intelligent data placement in an electronic environment. The technique involves selecting, from a pool of candidate local area networks (LANs) of the electronic environment, a plurality of LANs within which to store the data based on a set of policy priority levels assigned to the data. The technique further involves generating a set of information elements (e.g., data fragments, erasure codes, etc.) from the data, and placing the set of information elements on storage nodes of the plurality of LANs. Such a method enables the data to be stored in a distributed manner and alleviates the need for a central storage facility. Since the data is distributed among the storage nodes of the plurality of LANs, system capacity and infrastructure is able to grow (i.e., scale) in a manner which does not create a problematic bottleneck.

22 Claims, 8 Drawing Sheets

(56) References Cited

U.S. PATENT DOCUMENTS

| | | | |
|---|---|---|---|
| 2009/0207840 A1 | 8/2009 | McCanne | |
| 2010/0088335 A1* | 4/2010 | Mimatsu | 707/770 |
| 2010/0332530 A1* | 12/2010 | McKelvie et al. | 707/770 |
| 2011/0271007 A1 | 11/2011 | Wang et al. | |
| 2011/0276656 A1* | 11/2011 | Knapp et al. | 709/219 |
| 2012/0278469 A1* | 11/2012 | Cannon et al. | 709/223 |
| 2013/0034031 A1 | 2/2013 | Sherman et al. | |
| 2013/0262189 A1* | 10/2013 | Anderson et al. | 705/7.36 |

OTHER PUBLICATIONS

Castro et al., "Topology-Aware Routing in Structured Peer-to-Peer Overlay Networks", A. Schiper et al. (Eds.), Future Directions in DC 2002, pp. 103-107, 2003.

Chang et al., "Bigtable: A Distributed Storage System for Structured Data", ACM. Trans. Comput. Syst. 26, 2, Article 4, Jun. 2008.

DeCandia et al., "Dynamo: Amazon's Highly Available Key-Value Store", SOSP'07, Oct. 14-17, 2007, Stevenson, Washington.

Dabek et al., "Designing a DHT for Low Latency and High Throughput", NSDI'04 Technical Paper, retrieved from http://static.usenix.org/events/nsdi04/tech/full_papers/dabek/dabek_html/ on Jul. 19, 2012.

Dabek et al., "Vivaldi: A Decentralized Network Coordinate System", SIGCOMM'04, Aug. 30-Sep. 3, 2004, Portland, Oregon.

Goodson et al., "Efficient Byzantine-Tolerant Erasure-Coded Storage", Proc. of the 2004 Int. Conference on Dependable Systems and Networks (DSN '04), IEEE Computer Society, 2004.

Greenan et al., "Reliability of XOR Based Erasure Codes on Heterogeneous Devices", International Conference on Dependable Systems and Networks, Anchorage, AK, pp. 147-156, Jun. 24-27, 2008.

Greenan, "Reliability and Power-Efficiency in Erasure-Coded Storage Systems", Technical Report UCSC-SSRC-09-08, University of California, Santa Cruz, Dec. 2009.

Hafner et al., "Notes on Reliability Models for Non-MDS Erasure Codes", IBM report, 2006.

Lakshman et al., "Cassandra—A Decentralized Structured Storage System", ACM SIGOPS Operating Systems Review, vol. 44, Issue 2, pp. 35-40, Apr. 2010.

Prasad et al. "Bandwidth Estimation: Metrics, Measurement Techniques, and Tools", IEEE Network, vol. 17, Issue 6, pp. 27-35, Nov./Dec. 2003.

Ratnasamy et al., "A Scalable Content-Addressable Network", SIGCOMM01, Aug. 27-31, 2001, San Diego, CA.

Ratnasamy et al., "Topologically-Aware Overlay Construction and Server Selection", INFOCOM2002, 21st Annual Joint Cont. of the IEEE Comp. and Com. Societies, pp. 1190-1199, 2002.

Rowstron et al., "Pastry: Scalable, Distributed Object Location and Routing for Large-Scale Peer-to-Peer Systems", R. Guerraoui (Ed.), Middleware 2001, pp. 329-350, 2001.

Stoica et al., "Chord: A Scalable Peer-to-Peer Lookup Service for Internet Applications", SIGCOMM'01, Aug. 27-31, 2001, San Diego, CA.

Weatherspoon, Hakim, "Design and Evaluation of Distributed Wide-Area On-line Archival Storage Systems", Appears in University of California, Berkeley PhD Dissertation. Technical Report No. UCB/EECS-2006-130, Oct. 13, 2006.

Weil et al., "CRUSH: Controlled, Scalable, Decentralized Placement of Replicated Data", SC2006, Nov. 2006, Tampa, FL.

* cited by examiner

POLICY BASED INTELLIGENT DATA PLACEMENT

CROSS REFERENCE TO RELATED APPLICATIONS

This application claims the benefit under 35 U.S.C. §119 (e) of U.S. Provisional Application Ser. No. 61/582,125 entitled "TECHNIQUES FOR POLICY-BASED INTELLIGENT DATA PLACEMENT," filed on Dec. 30, 2011, the contents and teachings of which are hereby incorporated by reference in their entirety.

BACKGROUND

A conventional approach to storing data is to collect the data at a main data center or a central storage repository. For example, suppose that a corporate enterprise wishes to save video surveillance files from multiple remote video camera installations. The hardware at each video camera installation may send a respective video surveillance file to a centralized facility (e.g., a corporate data center) for storage.

While the video surveillance files are stored at the centralized facility, the video surveillance files may be saved in a fault tolerant manner. For example, the video surveillance files may be stored according to a particular RAID level, may be backed up, etc.

SUMMARY

Unfortunately, there are deficiencies with the above-described conventional approach to storing data at a centralized facility. In particular, it is expensive to fortify and maintain such a centralized facility. Along these lines, there are costs associated with hiring, training, and carrying staff to run the centralized facility.

Additionally, the topology of a centralized facility does not scale well. That is, eventually the centralized facility may become a bottleneck to incoming traffic and data storage operations, as well as outgoing traffic and data retrieval operations.

Moreover, the centralized facility provides a single point which is susceptible to failure. For example, a localized event at the centralized facility such as an earthquake or flood may disable the ability to store data for the entire enterprise.

In contrast to the above-described conventional approach to storing data at a centralized facility, an improved technique intelligently places data among storage nodes of selected local area networks (LANs). This technique is capable of selecting LANs from a pool of candidate LANs in accordance with a rich set of flexible data placement policies. Such policies include (i) a traffic optimization policy to optimize network traffic when storing the data, (ii) a network bandwidth utilization policy to prefer utilization of LANs with high network bandwidth density when storing the data, and (iii) a data redundancy policy to store data on LANs with low failure correlations. Such operation enables an electronic environment formed by the LANs to accommodate different system requirements (e.g., network latency requirements, input/output performance requirements, system reliability requirements, etc.). Moreover, since data is distributed among storage nodes of a plurality of LANs, system capacity is able to grow (i.e., scale) as the electronic environment grows without creation of a problematic bottleneck.

One embodiment is directed to a method of storing data in an electronic environment. The method includes selecting, from a pool of candidate LANs of the electronic environment, a plurality of LANs within which to store the data based on a set of policy priority levels assigned to the data (e.g., "high", "medium" or "low" for each policy). The method further includes generating a set of information elements from the data (e.g., data fragments and erasure codes from chunks of the data), and placing the set of information elements on storage nodes of the plurality of LANs. Such a method enables the data to be stored in a distributed manner and alleviates the need for a central storage facility.

In some arrangements, selecting the plurality of LANs from the pool of candidate LANs includes receiving, as the set of policy priority levels:
(i) a traffic optimization priority setting which identifies a policy priority level for a traffic optimization policy to optimize network traffic when storing the data within the electronic environment,
(ii) a network bandwidth utilization priority setting which identifies a policy priority level for a network bandwidth utilization policy to utilize LANs with high network bandwidth density (e.g., high cluster bandwidth density), when storing the data within the electronic environment, and
(iii) a data redundancy priority setting which identifies a policy priority level for a data redundancy policy to store data on LANs with low failure correlations.

In these arrangements, selecting the plurality of LANs further involves forming a policy ranking among the traffic optimization policy, the network bandwidth utilization policy, and the data redundancy policy based on the traffic optimization priority setting, the network bandwidth utilization priority setting, and the data redundancy priority setting. After the policy ranking is formed, selecting the plurality of LANs further includes choosing LANs from the pool of candidate LANs in accordance with the policy ranking.

In some arrangements, choosing the LANs from the pool of candidate LANs in accordance with the policy ranking includes:
(i) identifying a first group of candidate LANs from the pool of candidate LANs based on a first ranked policy in the policy ranking,
(ii) identifying a second group of candidate LANs from the first group of candidate LANs based on a second ranked policy in the policy ranking, and
(iii) identifying, as the LANs chosen from the pool of candidate LANs, a third group of candidate LANs from the second group of candidate LANs based on a third ranked policy in the policy ranking.

Accordingly, the method is capable of choosing LANs based on multiple policies organized in a ranking.

In some arrangements, generating the set of information elements from the data includes dividing the data into chunks of data and, for each data chunk, partitioning that chunk into K non-overlapping data fragments (i.e., each data fragment being different) and creating (N-K) erasure codes based on that chunk. In these arrangements, the K non-overlapping data fragments and the (N-K) erasure codes form N information elements. Additionally, the data chunk is recoverable from any combination of K non-overlapping data fragments and erasure codes of the N information elements. Furthermore, K, (N-K) and N are integers.

Other embodiments are directed to systems, apparatus, processing circuits, computer program products, and so on. Some embodiments are directed to various methods, electronic components and circuitry which are involved in policy-based intelligent data placement among storage nodes of a plurality of LANs.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved techniques perform policy-based intelligent placement of data among storage nodes of a plurality of local area networks (LANs). These technique are capable of selecting LANs from a pool of candidate LANs in accordance with different policies such as (i) a traffic optimization policy to optimize network traffic when storing the data, (ii) a network bandwidth utilization policy to utilize LANs with high network bandwidth density when storing the data, and (iii) a data redundancy policy to store data on LANs with low failure correlations. Such operation enables an electronic environment formed by the LANs to accommodate different system requirements (e.g., network latency requirements, input/output performance requirements, system reliability requirements, etc.). Moreover, since data is distributed among storage nodes of a plurality of LANs, system capacity and infrastructure is able to grow (i.e., scale) in a manner which does not create a problematic bottleneck.

Figure 1:
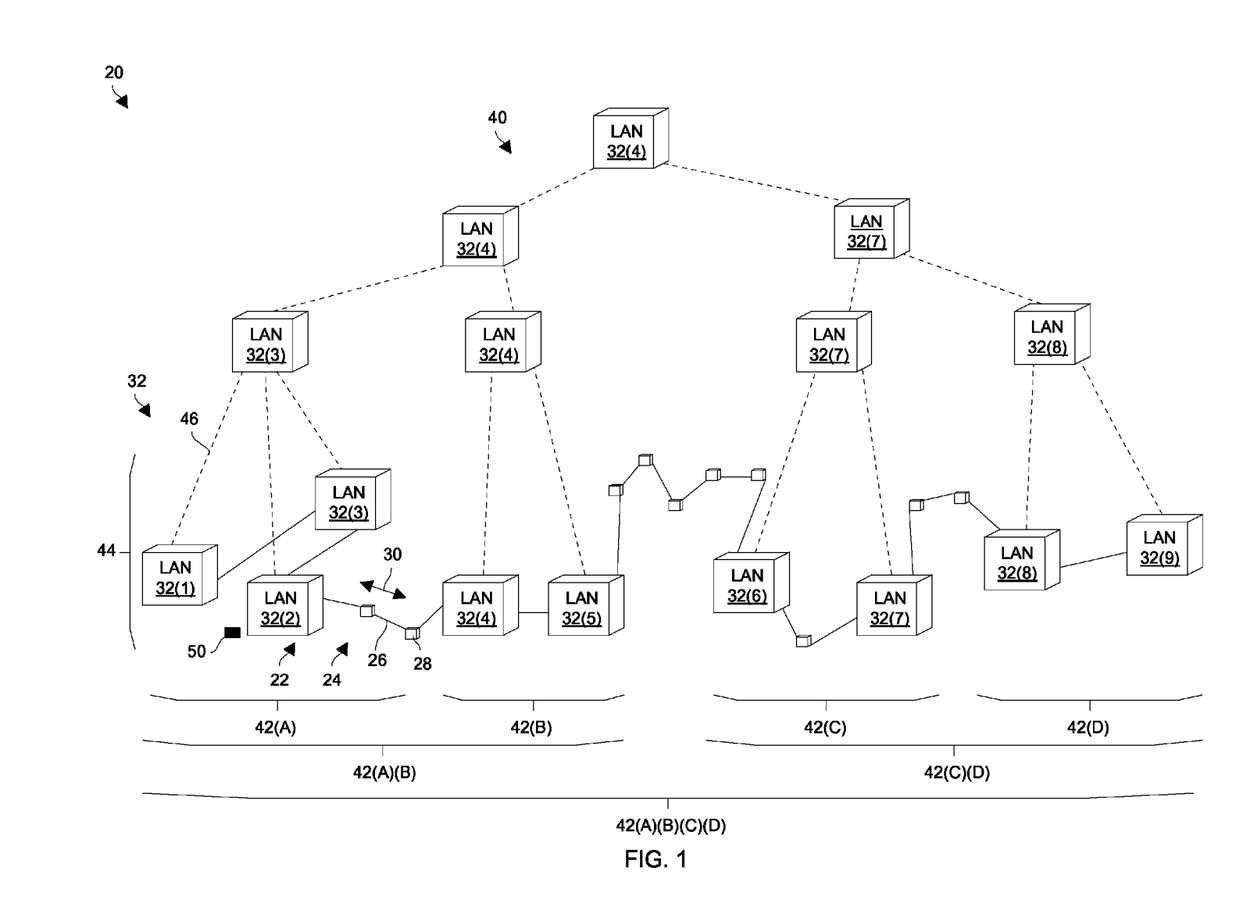
FIG. 1 is a block diagram of an electronic environment which is suitable for policy-based intelligent data placement.

FIG. 1 shows an electronic environment 20 which is suitable for policy-based intelligent data placement. The electronic environment 20 includes computerized storage devices (or nodes) 22 (details shown in FIG. 2) and a physical communications fabric 24. As will be explained in further detail shortly, each storage node 22 includes processing circuitry to perform useful work, and memory to store data. The physical communications fabric 24 includes a combination of cabling 26 and data communications devices 28 to convey electronic signals 30 between the storage nodes 22.

As shown in FIG. 1, the storage nodes 22 and the physical communications fabric 24 are arranged to form multiple LANs 32. Each LAN 32 includes at least one storage node 22. Furthermore, at least some of the physical communications fabric 24 extends outside of the LANs 32 and connects the LANs 32 together (e.g., between LANs 32(2) and 32(4)).

At this point, it should be understood that policy-based intelligent data placement within the electronic environment 20 utilizes a logical hierarchical view of the LANs 32. In particular, the LANs 32 are logically organized into a hierarchical arrangement 40 of LAN clusters 42 where each LAN 32 of the electronic environment 20 belongs to a level-1 cluster 42 (i.e., a lowest level cluster), the level-1 clusters 42 form level-2 clusters 42 (i.e., a higher level cluster), and so on.

In some arrangements, clustering of the LANs 32 is based on a distance metric. Suitable distance metrics include hop distance (e.g., hop count as measured by trace route or a similar utility), round trip time (RTT), bandwidth, combinations thereof, and so on. Along these lines, the LANs 32 form level-1 clusters 42 in which the LANs 32 in each level-1 cluster 42 are separated by a predefined level-1 distance metric (e.g., one hop at most, two hops at most, etc.). Likewise, the level-1 clusters 42 are organized into level-2 clusters 42 in which the level-1 clusters 42 in each level-2 cluster 42 are separated by another predefined level-2 distance metric (e.g., four hops at most, five hops at most, etc.), and so on.

It should be understood that additional clustering criteria can be imposed such as a maximum limit on the number of LANs 32 in each cluster 42, a limitation on a minimum amount of available storage capacity provided by each LAN 32 or by each storage node 22, etc. Accordingly, which LANs 32 belong to which clusters 42 may also be influenced by such criteria and thus determine when LANs 32 join the electronic environment 20, when LANs 32 leave the electronic environment 20, changes in the physical topology 44 of the communications fabric 24, and so on.

By way of example and as shown in FIG. 1, suppose that the LANs 32 of the electronic environment 20 are arranged into four level-1 clusters 42(A), 42(B), 42(C), 42(D) where the LAN 32 of each level-1 cluster 42 is separated by other LANs 32 within that level-1 cluster 42 by at most one hop, i.e., the predefined level-1 distance metric. In particular, LANs 32(1), 32(2), and 32(3) form the level-1 cluster 42(A). Similarly, LANs 32(4) and 32(5) form the level-1 cluster 42(B). Additionally, LANs 32(6) and 32(7) form the level-1 cluster 42(C). Furthermore, LANs 32(8) and 32(9) form the level-1 cluster 42(D).

It should be understood that LANs 32(2) and 32(4) cannot belong to the same level-1 cluster 42 since LANs 32(2) and 32(4) are too far apart based on the predefined level-1 distance metric, i.e., LANs 32(2) and 32(4) are separated by more than one hop. Likewise, LANs 32(7) and 32(8) cannot belong to the same level-1 cluster 42, and so on.

Moreover, suppose that the level-1 clusters 42(A) and 42(B) form a level-2 cluster 42(A)(B) because they are separated by at most four hops, i.e., the predefined level-2 distance metric is four hops at most. Similarly, suppose that the level-1 clusters 42(C) and 42(D) form another level-2 cluster 42(C)(D). Again, it should be understood that the level-1 clusters 42(A) and 42(B) cannot form a level-2 cluster 42 with level-1 clusters 42(C) and 42(D) since the level-1 clusters 42(A) and 42(B) are separated from the level-1 clusters 42(C) and 42(D) by more than the predefined level-2 distance metric (e.g., five hops separate LANs 32(5) and 32(7)).

Additionally, suppose that level-2 clusters 42(A)(B) and 42(C)(D) form a level-3 cluster 42(A)(B)(C)(D) by complying with a predefined level-3 distance metric (e.g., seven hops at most). It should be understood that this clustering technique can continue beyond three levels for larger scale hierarchical arrangements 40, and that the particular predefined distance metrics provided above are by way of example only.

The structure of the hierarchical arrangement 40 is illustrated via the dashed lines 46 in FIG. 1. In particular, each level-1 cluster 42 has a LAN representative (LR) which represents that level-1 cluster 42 in the electronic environment 20. By way of example, the LR for level-1 cluster 42(A) is LAN 32(3). The LR for level-1 cluster 42(B) is LAN 32(4).

The LR for level-1 cluster 42(C) is LAN 32(7). The LR for level-1 cluster 42(D) is LAN 32(8).

As further shown by the dashed lines 46, LAN 32(4) is also the representative of the level-2 cluster 42(A)(B). Similarly, LAN 32(7) is also the representative of the level-2 cluster 42(C)(D).

Furthermore, LAN 32(4) is the representative of the level-3 cluster 42(A)(B)(C)(D). Since there is only one level-3 cluster and there are only three cluster levels in the electronic environment 20, LAN 32(4) is considered the root node of the hierarchical arrangement 40, i.e., the LAN 32(4) operates at as representative of the entire hierarchy. General details of how the electronic environment 20 accomplishes policy-based intelligent data placement will now be provided.

To configure a particular storage node 22 which operates as a source of data 50 (i.e., a source node 22), a user (e.g., an administrator) provides the source node 22 with a set of policy priority levels. This set of policy priority levels controls ordering of data placement policies which are applied during a LAN selection process.

The source node 22 is then ready to intelligently place the data 50 within the electronic environment 20. To this end, the source node 22 divides the data 50 (e.g., a file) into chunks (i.e., smaller portions). For each chunk, the source node 22 selects, from a pool of candidate LANs 32, certain LANs 32 within which to store information elements which are derived from that chunk. The particular LANs 32 selected by the source node 22 may change from chunk to chunk. Additionally, the particular LANs 32 selected by the source node 22 may change based on the specific settings of the set of policy priority levels. Also, as part of this process, the source node 22 makes sure that the selected LANs 32 include enough storage nodes 22 and that the storage nodes 22 have enough storage capacity.

After the source node 22 has identified the LANs 32 within which to store a particular chunk, the source node 22 generates a set of information elements (IEs) from that chunk while that chunk is cached in memory of the source node 22. As will be discussed in further detail shortly, the set of IEs includes data fragments (i.e., parts of the chunk) and erasure codes to enable all of that chuck to be recovered from a subset of all the information elements.

Next, the source node 22 places the IEs on the storage nodes 22 of the selected LANs 32. As part of this process, the source node 22 additionally creates a metadata file which contains the locations of where the IEs are stored (e.g., a list of storage nodes 32), and then distributes multiple copies of the metadata file among various storage nodes 22 of the electronic environment 20. Further details will now be provided with reference to FIG. 2.

Figure 2:
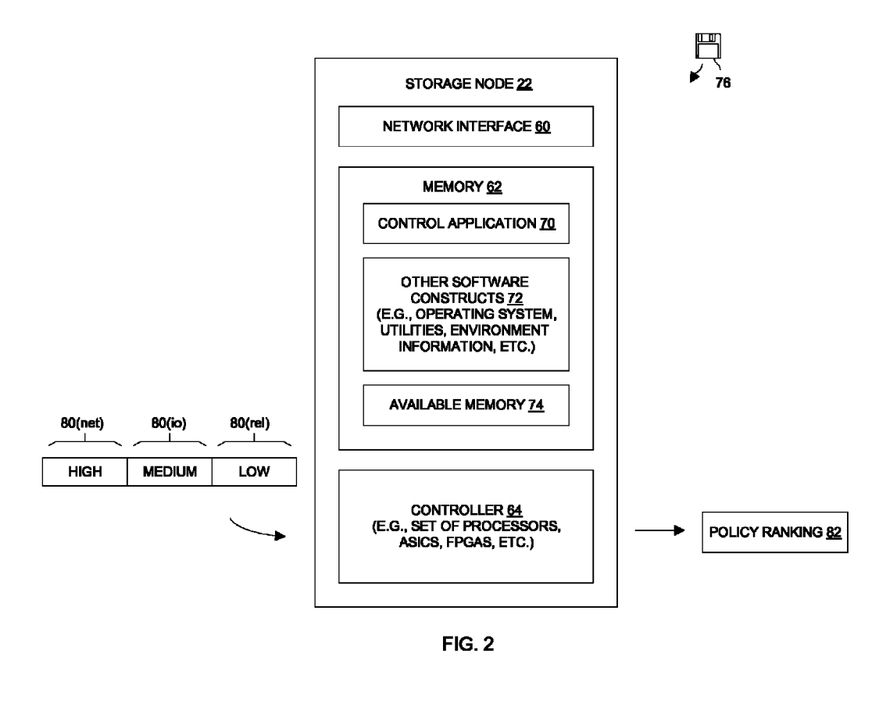
FIG. 2 is a block diagram of a device of the electronic environment of FIG. 1.

FIG. 2 shows particular details of a storage node 22 of the electronic environment 20. The storage node 22 is equipped to store data on behalf of other storage nodes 22 (i.e., source nodes 22) as well as operate as a source node 22 to store data on other storage nodes 22. As shown in FIG. 2, the storage node 22 includes a network interface 60, memory 62, and a controller 64.

The network interface 60 is constructed and arranged to connect the storage node 22 to the communications fabric 24 (also see FIG. 1) and thus communicate with other storage nodes 22 in the electronic environment 20. In some arrangements, the network interface 60 is implemented in the form of a network card or a network adapter module.

The memory 62 stores a control application 70 and other software constructs 72, as well as provides available storage space 74. The control application 70 includes instructions for directing the operation of the storage node 22. The other software constructs 72 represent other memory items which support operation of the storage node 22 (e.g., an operating system, the earlier-mentioned set of information elements, utilities and diagnostics, tables identifying other storage nodes in the hierarchy 40, etc.). The available storage space 74 provides memory capacity for caching the data 50, storing data on behalf of other storage nodes 22, work space for generating chunks and IEs, and so on. It should be understood that the memory 62 reflects both volatile and non-volatile storage of the storage node 22.

The controller 64 is constructed and arranged to control the operation of the storage node 22. It should be understood that the controller 64 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 76 is capable of delivering all or portions of the controlling software to the storage node 22. The computer program product 76 has a non-transitory (or non-volatile) computer readable medium which stores a set of instructions which controls one or more operations of the storage node 22. Examples of suitable computer readable storage media include tangible articles of manufacture and apparatus which store instructions in a non-volatile manner such as CD-ROM, flash memory, disk memory, tape memory, and the like.

As shown in FIG. 2, the user assigns a set of policy priority levels 80 which directs the manner in which the storage node 22 should intelligently place the data 50. The set of policy priority levels 80 includes a traffic optimization priority setting 80(net) which identifies a policy priority level for a traffic optimization policy to optimize network traffic when storing the data 50 within the electronic environment 20. Additionally, the set of policy priority levels 80 includes a network bandwidth utilization priority setting 80(io) which identifies a policy priority level for a network bandwidth utilization policy to utilize LANs with high network bandwidth density when storing the data 50 within the electronic environment 20. Furthermore, the set of policy priority levels 80 includes a data redundancy priority setting 80(rel) which identifies a policy priority level for a data redundancy policy to store data on LANs with low failure correlations, i.e., high reliability.

The set of policy priority levels 80 may be delivered to the storage node 22 through a user interface (e.g., a combination of a keyboard, mouse and display) or alternatively programmed remotely (i.e., through the network interface 60). Each policy priority level 80 is capable of having a priority value which enables the policies to be ranked. For instance, suppose that each policy priority level 80 is capable of being set to "HIGH", "MEDIUM" or "LOW". Such an arrangement enables the controller 64 to form a policy ranking 82, i.e., an order of which of the policies to impose first. Once the controller 64 forms the policy ranking 82, the controller 64 then selects LANs 32 by applying the policies in order of the policy ranking 82.

For example, suppose that the values of the settings 80(net), 80(io), and 80(rel) are "HIGH", "MEDIUM", and "LOW", respectively (see FIG. 2). Upon receipt of these settings 80, the controller 64 forms a policy ranking 82 in which the traffic optimization policy is applied first (i.e., since the corresponding setting is given the highest priority value), the network bandwidth utilization policy is applied second (i.e., since the corresponding setting is given the next highest priority value), and the data redundancy policy is applied third (i.e., since the corresponding setting is given the next highest priority value).

As another example, suppose that the values of the settings 80(net), 80(io), and 80(rel) are "HIGH", "MEDIUM", and "HIGH", respectively. In this situation, the controller 64 forms a policy ranking 82 in which the traffic optimization policy and the data redundancy policy are applied first (perhaps with the traffic optimization policy applied ahead of the data redundancy policy). Furthermore, the policy ranking 82 indicates that the network bandwidth utilization policy is applied last since it has the lowest value relative to the others. Further details will now be provided with reference to FIG. 3.

Figure 3:
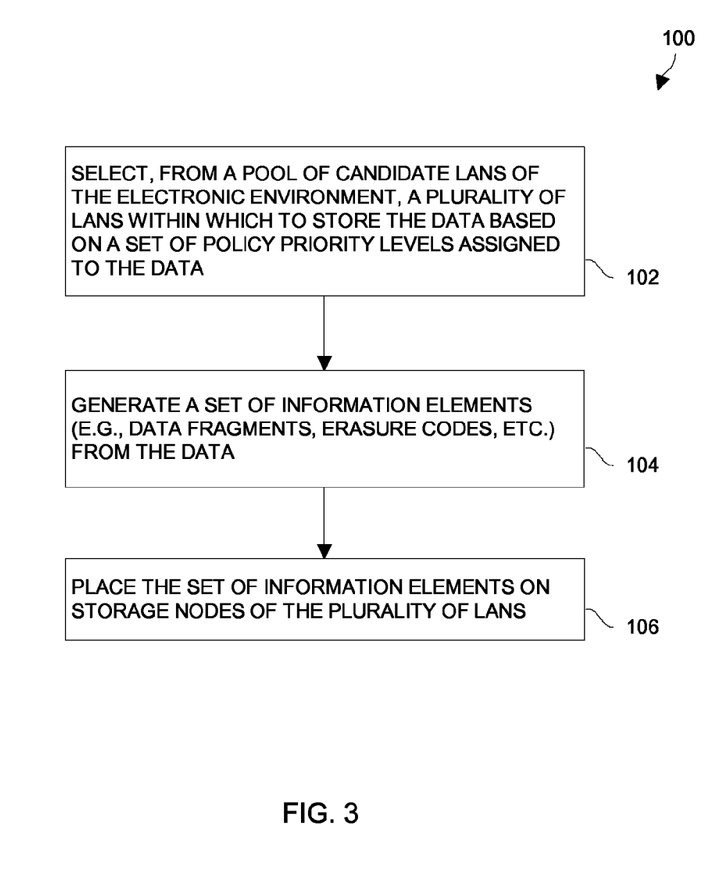
FIG. 3 is a flowchart of a procedure which is performed by the device of FIG. 2.

FIG. 3 shows a flowchart of a procedure 100 which is performed by the controller 64 to accomplish policy-based intelligent placement of data (e.g., a chunk or portion of a file). In step 102, the controller 64 selects, from a pool of candidate LANs 32 of the electronic environment 20, LANs 32 within which to store the data based on the set of policy priority levels 80 assigned to the data (also see FIG. 2). In particular, the controller 64 forms a policy ranking 82 based on the set of policy priority levels 80. The controller 64 then applies the highest ranked policy to identify a first group of candidate LANs 32 from the pool of candidate LANs 32. Next, the controller 64 applies the next highest ranked policy to identify a second group of candidate LANs 32 from the first group of candidate LANs 32. Finally, the controller 64 applies the next highest ranked policy to identify, as the selected LANs 32, a third group from the second group of candidate LANs 32. In this manner, the original pool is narrowed down systematically based on the set of policy priority levels 80.

In step 104, the controller 64 generates a set of information elements from the data. It should be understood that the data may be a chunk or portion of a file. In some arrangements, the controller 64 partitions that chunk into K non-overlapping data fragments and creates (N-K) erasure codes based on the chunk thus forming a total of N information elements. The erasure codes are generated such that the chunk can be fully recovered from any K information elements. Particular details of the data fragmenting and erasure coding process will be provided shortly with reference to FIG. 4.

In step 106, the controller 64 places the N information elements on storage nodes 22 of the selected LANs 32. The controller 64 further creates a metadata file which stores the particular storage nodes 22 on which the N information elements are stored, and places copies of the metadata file in the electronic environment 20 in a distributed manner as well. Further details of the LANs selection process will now be provided with reference to FIG. 4.

Figure 4:
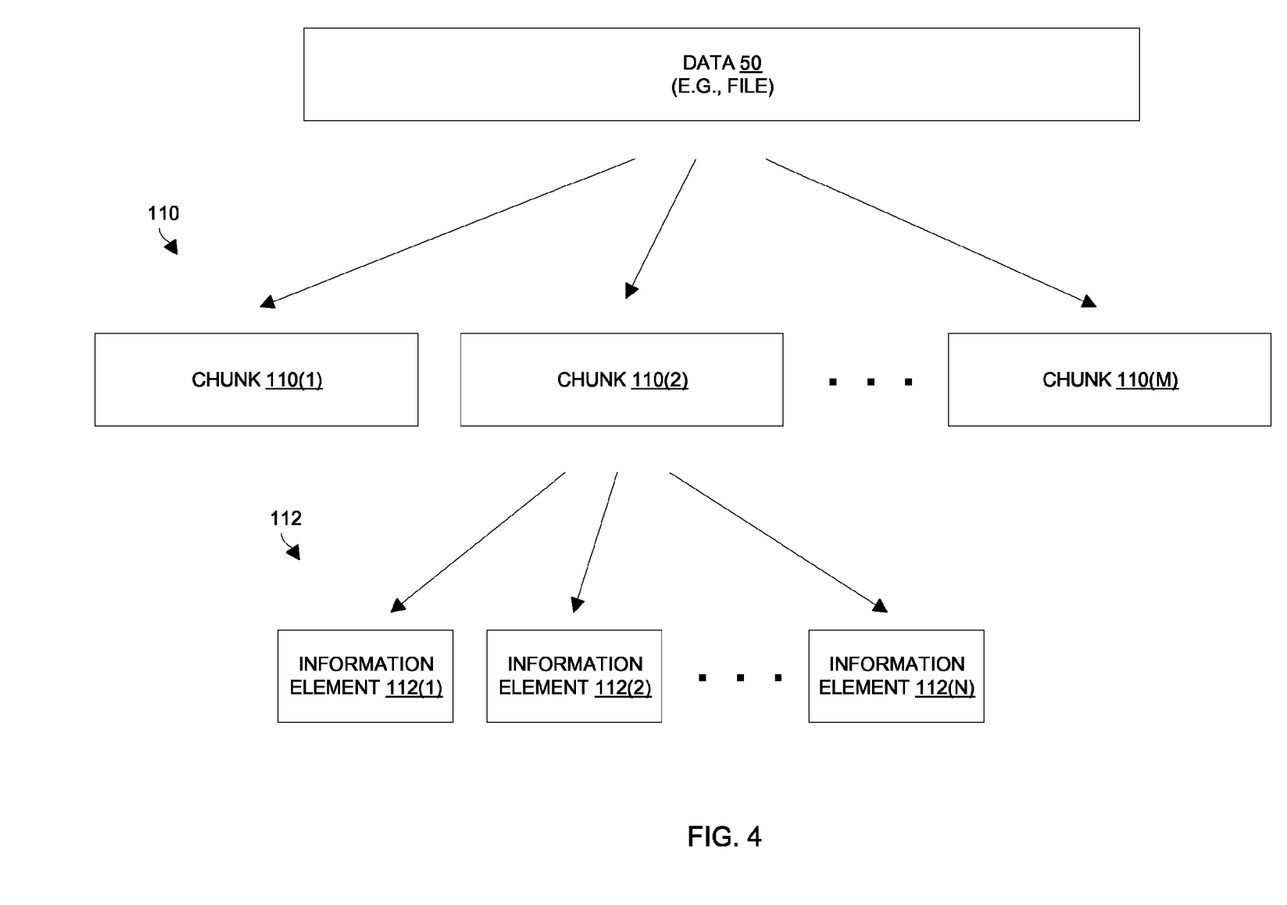
FIG. 4 is a block diagram showing how information elements are generated from data for policy-based intelligent data placement.

FIG. 4 shows an example manner in which data 50 may be rendered for storage in the electronic environment 20. Here, the controller 64 divides the data 50 (e.g., video data obtained from a video camera, a large data file, etc.) into multiple chunks 110(1), 110(2), . . . 110(M) (collectively, chunks 110).

The controller 64 then partitions each chunk 110 into multiple data fragments and performs an erasure coding operation to generate erasure codes for that chunk 110. For example, the controller 64 partitions the chunk 110(2) and performs an erasure coding operation to form multiple information elements 112(1), 112(2), . . . 112(N) (collectively, information elements or IEs 112). Owing to the nature of the erasure coding operation, a total of N information elements 112 are created from the chunk 110 where, of the N information elements 112, there are K data fragments and N-K erasure codes.

It should be understood that each chunk 110 is then capable of being reconstructed from any K information elements 112 (where K<N) generated from that chunk 110 with no data loss. For example, suppose that 20 information elements are created from a chunk 110 (i.e., N=20) of which any 15 information elements are needed to reconstruct the chunk 110 (i.e., K=15). In this situation, up to five information elements may be lost or destroyed without data loss. Further details will now be provided with reference to FIG. 5.

Figure 5:
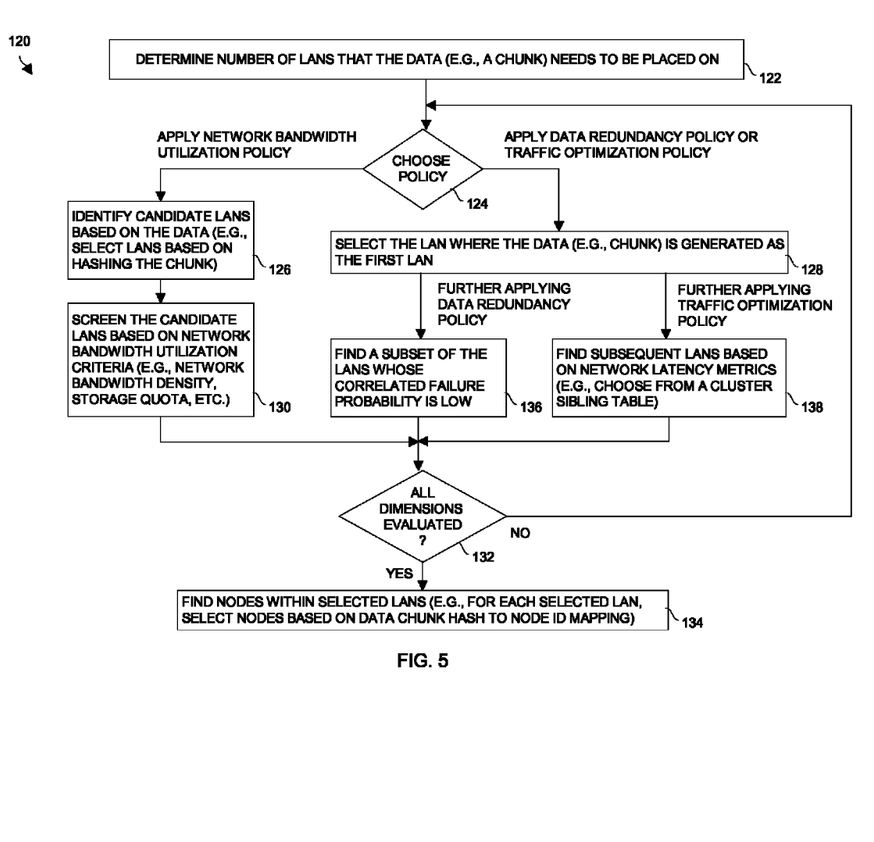
FIG. 5 is a flowchart showing details of a particular step of the procedure of FIG. 3.

FIG. 5 is a flowchart of a procedure 120 for processing a chunk of data 50. In particular, FIG. 5 shows certain details for selecting LANs 32 within which to store a chunk of data based on the set of policy priority levels 80 assigned to the data (also see step 102 of the procedure 100 in FIG. 3). As shown, the procedure 120 includes three paths corresponding to (i) the network bandwidth utilization policy, (ii) the traffic optimization policy, and (iii) the data redundancy policy.

In step 122, the controller 64 (FIG. 2) determines the number of LANs 32 that the chunk needs to be placed on. For example, suppose that the chunk is to be processed into 20 information elements (i.e., N=20) and that the chunk can be recovered from any 15 information elements (i.e., K=15). In this situation, there are 15 data fragments and 5 erasure codes to be distributed within among LANs within the electronic environment 20. Accordingly, step 122 may determine that the information elements should be distributed among at least four LANs 32 with each LAN 32 having at least five storage nodes 22. Step 122 then proceeds to step 124.

In step 124, the controller 64 chooses a path to follow. In particular, the controller 64 refers to the policy ranking 82 and picks a path corresponding to the policy with the highest priority level setting 80. If the network bandwidth utilization policy is ranked the highest, the controller 64 proceeds to step 126. Otherwise, the controller 64 proceeds to step 128.

In step 126, the controller 64 identifies candidate LANs 32 based on the data 50. For example, to process a chunk 110 (also see FIG. 4), the controller 64 may hash the chunk 110 using a hash algorithm to generate a hash value and then use that hash value to identify particular LANs 32 of the electronic environment 20 (e.g., use the hash value as a LAN identifier to identify a chain or series of LANs 32). Step 126 then proceeds to step 130.

In step 130, the controller 64 screens the identified candidate LANs 32 with regard to certain network bandwidth utilization criteria. Along these lines, the controller 64 evaluates a cluster bandwidth density of each cluster 42 that it knows of. In particular, cluster bandwidth density is the average bandwidth between any pair of the child members of the cluster.

For example, with reference to FIG. 1, suppose that the bandwidth between LANs 32(1) and 32(2) is BW1, the bandwidth between LANs 32(2) and 32(3) is BW2, and the bandwidth between LANs 32(1) and 32(3) is BW3. Here, the average bandwidth density of cluster 42(A) equals (BW1+BW2+BW3)/3.

Moreover, with reference still on FIG. 1, suppose that the bandwidth between LANs 32(2) and 32(5) is BW4. The LAN access bandwidth density for LANs 32 in the cluster 42(A) can be defined as the minimum of the level-1 cluster bandwidth density and this level-2 cluster bandwidth density. That is, the LAN access bandwidth density for LANs 32 in the cluster 42(A) is equal to: min {(BW1+BW2+BW3)/3, BW4}.

If the LAN access bandwidth density for any LANs 32 does not meet a network bandwidth utilization criteria (e.g., the bandwidth density exceeds a particular network bandwidth density threshold), those LANs 32 are eliminated from consideration. All of the remaining LANs 32 are still available for selection. Step 130 then proceeds to step 132.

In step 132, if all of the dimensions have been evaluated (i.e., if all of the policies have been applied), step 132 proceeds to step 134. However, if there is at least one dimension that has not yet been evaluated, step 132 proceeds back to step 124 where the controller 64 chooses another path to follow.

In step 128, when the controller 64 has selected either the data redundancy policy or the traffic optimization policy based on the policy ranking 82, the controller 64 selects the LAN 32 where the chunk 110 is generated. If the controller 64 had selected the data redundancy policy, the controller 64 then proceeds to step 136. However, if the controller 64 had selected the traffic optimization policy, the controller 64 then proceeds to step 138.

In step 136, when the controller 64 is applying the data redundancy policy, the controller 64 selects a subset of LANs 32 whose correlated failure probability is low. In particular, the controller 64 screens particular candidate LANs 32 based on failure correlation metrics representing failure correlation between the source LAN 32 and known candidate LANs 32. The controller 64 eliminates a particular candidate LAN 32 from possible selection if a failure correlation metric representing failure correlation between the source LAN 32 and that candidate LAN 32 is greater than a particular failure correlation threshold. Step 136 then proceeds to step 132.

In connection with step 138 which follows from step 128 when applying the traffic optimization policy, the controller 64 selects a subset of LANs 32 based on network latency metrics representing network latencies between the source LAN 32 and particular candidate LANs 32. In particular, the controller 64 screens particular candidate LANs 32 based on network latency between the source LAN 32 and known candidate LANs 32. The controller 64 eliminates a particular candidate LAN 32 from possible selection a network latency metric representing network latency between the source LAN 32 and the particular candidate LAN 32 exceeds a particular network latency threshold. Step 138 then proceeds to step 132.

As mentioned above, in step 132, if all of the policies have been applied, the controller 64 proceeds to step 134. In step 134, the controller 64 finds N storage nodes 22 (FIG. 2) within which to store the N information elements. For example, the controller 64 may hash the chunk using a hash algorithm to generate a hash value and then use that hash value to identify particular storage nodes 22 of the selected LANs 32 (e.g., use the hash value as a node identifier to identify a group or chain of nodes 22).

It should be understood that the iterative operation of the procedure 120 enables the candidate LANs 32 to be narrowed in an intelligent manner. The particular LANs 32 that remain may thusly differ based on the order in which the policies are applied. However, it will be appreciated that the application of some policies may have little or no effect in eliminating candidate LANs 32 (e.g., if the predefined threshold criteria is so forgiving, all or most of the candidate LANs 32 may still comply).

It should be further understood that, in some arrangements, the hash algorithm which is used to generate node identifiers is different than the hash algorithm which is used to generate LAN identifiers. As a result, node selection is more evenly distributed (i.e., there less likelihood of developing a hot spot).

Once the controller 64 has performed the procedure 120 for one chunk of the data 50, the controller 64 performs the procedure 120 for the next chunk of the data 50, and so on. Accordingly, different LANs 32 may be selected for each chunk, and different nodes may be selected for each chunk.

Figure 6:
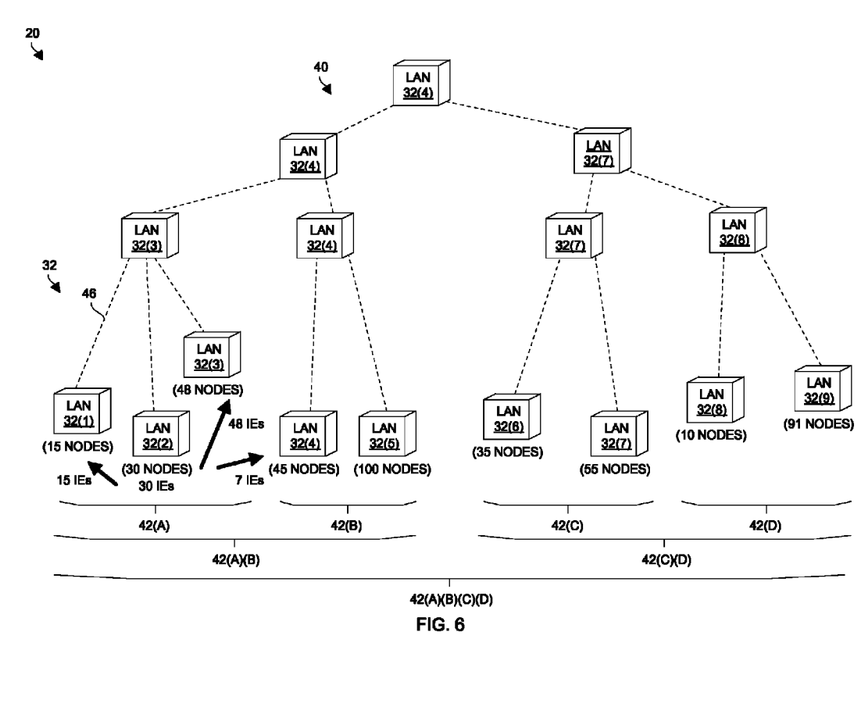
FIG. 6 is a diagram of a first example policy-based intelligent data placement operation performed by the electronic environment of FIG. 1.
Figure 7:
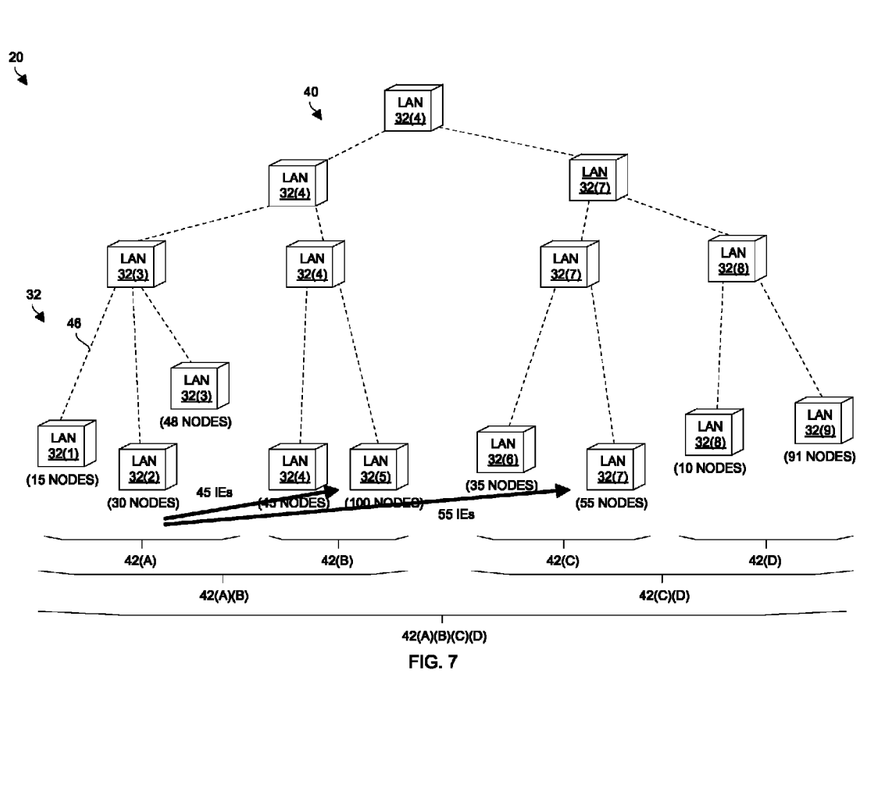
FIG. 7 is a diagram of a second example policy-based intelligent data placement operation performed by the electronic environment of FIG. 1.
Figure 8:
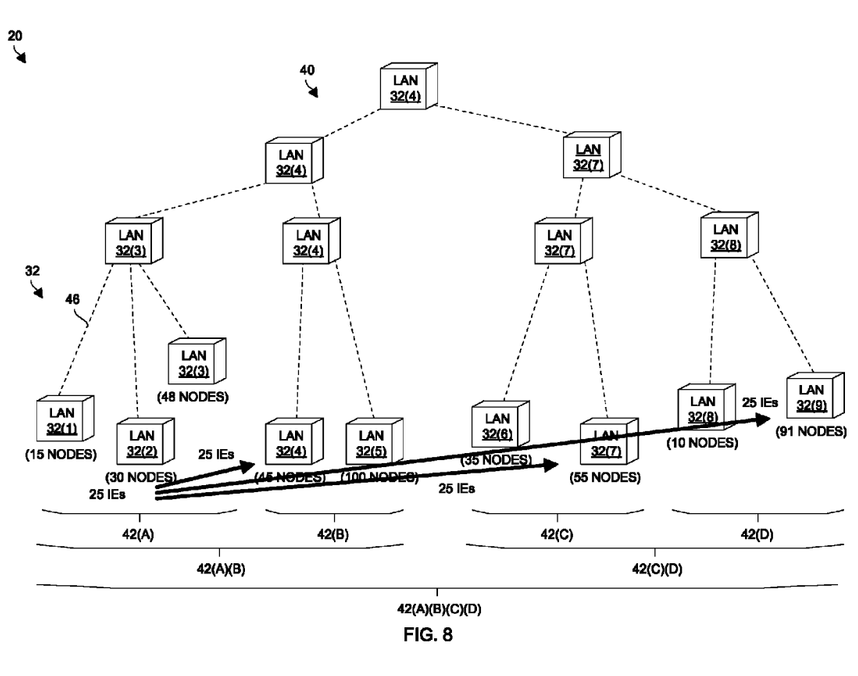
FIG. 8 is a diagram of a third example policy-based intelligent data placement operation performed by the electronic environment of FIG. 1.

Further details will now be provided with reference to FIGS. 6, 7 and 8, and separate examples of policy-based intelligent data placement. FIGS. 6, 7 and 8 show the LANs 32 of FIG. 1 from the hierarchical perspective. An example number of storage nodes 22 for each LAN 32 is listed underneath that LAN 32. Additionally, the physical topology 44 (copper pathways between LANs 32) is omitted from FIGS. 6, 7 and 8 for simplicity. Nevertheless, it should be understood that the source nodes 22 of the LANs 32 communicate with each other via the physical topology 44.

Example 1

Traffic Optimization Preferred

FIG. 6 shows an intelligent data placement example when reducing network latency is the highest priority for efficient write operations. In the example, the source node 22 applies the traffic optimization policy first. That is, the user provides the set of policy priority levels 80 to the source node 22, and the set of policy priority levels 80 indicates that the traffic optimization policy has the highest priority and should be applied ahead of the other policies. Accordingly, in this example, intelligent data placement prefers placement of the information elements (IEs) on storage nodes 22 which are close to the source node 22, to reduce network latency.

As shown in the FIG. 6 example, suppose that a storage node of the LAN 32(2) is the source of 100 IEs (i.e., N=100) derived from a data chunk. When this source node selects LANs 32 for data placement (also see step 102 in FIG. 3), the source node runs through the procedure 120 in FIG. 5 initially following the rightmost path.

In particular, in connection with step 122 in FIG. 5, the source node may determine that there is no requirement as to the number of LANs 32 needed (e.g., perhaps the data redundancy setting 80(rel) is set to "LOW"). The source node then proceeds through steps 128 and 138 on the right side of the flowchart.

In accordance with step 128 (FIG. 5), the source node selects the LAN 32 to which it belongs, i.e., LAN 32(2). The source node determines that LAN 32(2) includes 30 storage nodes. The source node then proceeds to step 138 (FIG. 5).

In accordance with step 138, the source node attempts to find additional storage nodes to satisfy storage of all 100 IEs. Since there are not enough storage nodes within the LAN 32(2) to fully satisfy storage of all 100 IEs, the source node considers LANs 32 within the same level-1 cluster 42 (i.e., cluster 42(A)) but initially ignoring other LANs 32. To this end, the source node accesses a table within its memory 62 (also see the software constructs 72 in FIG. 2) that identifies sibling LANs 32 within its immediate level-1 cluster, i.e., cluster 42(A). This table, which is referred to as a cluster sibling table, indicates that LANs 32(1) and 32(3) belong the cluster 42(A). The table further indicates that LAN 32(1) has 15 available storage nodes and that LAN 32(3) has 48 available storage nodes. Accordingly, the source node now knows that there are 93 available storage nodes in the cluster 42(A) (i.e., 30+15+48=93).

At this point, the source node determines that it must expand its range to look within its level-2 cluster 42(A)(B) for an additional 7 storage nodes (i.e., 100−93=7). Accordingly, the source node includes LANs 32(4) and 32(5) as additional candidates but excludes the other LANs 32 which are outside the level-2 cluster 42(A)(B). Since the additional candidate LANs 32 include at least 7 storage nodes, the source node is able to satisfy the storage requirements for the data chunk.

It should be understood that step 132 (FIG. 5) directs the source node to perform two more iterations through the procedure 120 in order to apply the network bandwidth utilization policy and the data redundancy policy. However, such passes may not affect the LAN selection results. In this example, suppose that the remaining two passes result in prioritization of LAN 32(4) over LAN 32(5).

Next, in connection with step 134 (FIG. 5), the source node selects the storage nodes within the selected LANs 32. In particular, the source node selects all of the storage nodes of the LANs 32(2), 32(1) and 32(3). Additionally, since LAN 32(4) has 45 available storage nodes but only 7 storage nodes are needed, the source node may perform a hash of the data (or chunk) to identify 7 storage nodes of the LAN 32(4).

Once the source node has identified 100 storage nodes, the source node sends the 100 information elements to the 100 storage nodes to distribute the 100 information elements among the storage nodes of the electronic environment 20 (also see step 106 in FIG. 3). In particular, as shown in FIG. 6, the source node places 30 IEs in the 30 storage nodes of the current LAN 32(2). Additionally, the source node places 15 other IEs in the 15 storage nodes of the LAN 32(1), and 48 other IEs in the 48 storage nodes of the LAN 32(3). The source node may select 7 of the 45 storage nodes of LAN 32(4) using a separate hash algorithm.

Furthermore, the source node stores the location of each of the 100 IEs placed within the 100 storage nodes in a metadata file, and distributes copies of that metadata file among multiple storage nodes within the electronic environment 20 as well. In some arrangements, the source node places at least one copy of the metadata file on each LAN 32 which further holds an information element.

Accordingly, the 100 IEs are intelligently stored within the electronic environment 20. In particular, the IEs were distributed with a preference towards traffic optimization, namely, minimizing network latency. Nevertheless, as mentioned above, up to N-K information elements can be lost without losing any data of the data chunk. In particular, the highly available metadata identifies the locations of all of the IEs and the data chunk may be fully recovered from any K information elements.

Example 2

Network Bandwidth Utilization Preferred

FIG. 7 shows an intelligent data placement example when preferring placement of information elements (IEs) on LANs 32 having high network bandwidth density for efficient read operations if performed. In this example, the source node 22 applies the network bandwidth utilization policy to each data chunk first. That is, the user provides the set of policy priority levels 80 to the source node 22, and the set of policy priority levels 80 indicates that the network bandwidth utilization policy has the highest priority and should be applied to each data chunk ahead of the other policies. Accordingly, in this example, intelligent data placement prefers placement of the information elements (IEs) derived from each chunk on storage nodes 22 of LANs 32 having high network bandwidth density.

As shown in the FIG. 7 example, suppose that a storage node of the LAN 32(2) is the source of 100 IEs (i.e., N=100) derived from a particular data chunk. When this source node selects LANs 32 for data placement (also see step 102 in FIG. 3), the source node runs through the procedure 120 in FIG. 5 initially following the leftmost path.

In particular, in connection with step 122 in FIG. 5, the source node may determine that there is no requirement as to the number of LANs 32 needed (e.g., perhaps the data redundancy setting 80(rel) is set to "LOW"). The source node then proceeds through steps 126 and 130 on the left side of the flowchart.

In accordance with step 126 (FIG. 5), the source node identifies candidate LANs 32 based on the chunk. In some arrangements, the source node applies a first hashing algorithm to the chunk to identify a chain (or series) of candidate LANs 32 of a larger pool of candidate LANs 32. In this example, suppose that the resulting chain of candidate LANs 32 is LAN 32(8)>LAN 32(1)>LAN 32(7)>LAN 32(5)> . . . . The source node then proceeds to step 138 (FIG. 5).

In accordance with step 138, the source node screens the set of candidate LANs 32 based on network bandwidth density. Recall that cluster bandwidth density of each cluster 42 is easily calculated as the average bandwidth between any pair of child members of the cluster 42. Moreover, the LAN access bandwidth density for LANs 32 in a cluster 42 is equal to the lesser of the cluster bandwidth density and the bandwidth to neighboring clusters 42. With these network bandwidth density metrics, the source node eliminates all LANs 32 that do not comply with a network bandwidth criteria such as if their network bandwidth densities are less than a particular network bandwidth density threshold. In this example, suppose that the bandwidth density to LAN 32(8) is less than the threshold thus making LAN 32(8) non-compliant with the network bandwidth density criteria eliminating LAN 32(8). The source node may eliminate other non-compliant LANs 32 in the chain as well. However, further suppose that bandwidth density of LANs 32(1), LAN 32(7), and LAN 32(5) is greater than the threshold thus maintaining these LANs 32 of the series as candidates. Accordingly, the source node moves through the chain to the first available LAN that still complies with the network bandwidth density criteria, i.e., LAN 32(1).

From these remaining LANs 32 which are still available, the source node systematically picks enough remaining LANs 32 from the chain to provide enough storage nodes. In some arrangements, the source node may further eliminate LANs 32 that do not satisfy a predefined storage quota. In this example, suppose that LAN 32(1) does not have enough storage capacity to satisfy the predefined storage quota thus eliminating LAN 32(1) from candidacy. Again, the source node may eliminate other non-compliant LANs 32 in the series too. Accordingly, the source node moves through the chain to the first available LAN that still complies with the network bandwidth density criteria, i.e., LAN 32(7). In this example, suppose that LAN 32(5) which is the next LAN 32 in the chain still complies as well.

Once the first pass through the flowchart is complete, the source node performs two more passes through the flowchart in order to apply the traffic optimization policy and the data redundancy policy. However, such passes may not affect the LAN selection results. In this example, suppose that the remaining two passes do not change the LAN selection results.

At this point, the source node is ready to select nodes on which to place the IEs. In particular, the source node places the first 55 IEs on LAN 32(7) (i.e., the first LAN 32 remaining in the chain), and the remaining 45 IEs on the next LAN 32(5). If there were more IEs, the source node would then proceed to the next remaining LAN 32 in the chain, and so on. The results of the LAN selection process is illustrated by the thicker lines in FIG. 7.

In a manner similar to that described above in Example 1, once the source node has identified 100 storage nodes, the source node sends the 100 information elements to the 100 storage nodes to distribute the 100 information elements among the storage nodes of the electronic environment 20 (also see step 106 in FIG. 3). In particular, the source node places 55 IEs in the 55 storage nodes of the LAN 32(7). Additionally, the source node places the remaining 45 IEs among the 100 storage nodes of the LAN 32(5), e.g., by applying a separate hash algorithm to pick storage nodes in the LAN 32(5). Furthermore, the source node stores the location of each of the 100 IEs placed within the 100 storage nodes in a metadata file, and distributes copies of that metadata file among multiple storage nodes within the electronic environment 20 as well.

Accordingly, the 100 information elements are intelligently stored within the electronic environment 20. In particular, the information elements were distributed with a preference towards traffic optimization, namely, minimizing network latency for optimized read operations. Furthermore, as mentioned above, up to N-K information elements can be lost without losing access to the data chunk. In particular, the highly available metadata identifies the locations of all of the information elements and the chunk of data may be fully recovered from any K information elements.

Example 3

Data Reliability Preferred

FIG. 8 shows an intelligent data placement example when prioritizing data reliability, i.e., the ability to recover data. In the example, the source node 22 applies the data redundancy policy first to the chunk of data. That is, the user provides the set of policy priority levels 80 to the source node 22, and the set of policy priority levels 80 indicates that the data redundancy policy has the highest priority and should be applied ahead of the other policies. Accordingly, in this example, intelligent data placement prefers placement of the information elements (IEs) on storage nodes 22 of LANs 32 whose correlated failure probability is low to reduce the likelihood of data loss.

As shown in the FIG. 8 example, suppose that a storage node of the LAN 32(2) is the source of 100 IEs (i.e., N=100) derived from the data chunk. When this source node selects LANs 32 for data placement (also see step 102 in FIG. 3), the source node runs through the procedure 120 in FIG. 5 initially following the middle path.

In particular, in connection with step 122 in FIG. 5, the source node chooses to place the 100 IEs among multiple LANs 32 rather than a single LAN 32. Along these lines, the source node may determine that there are specified requirements. For example suppose that there is a requirement that up to 25 IEs may be lost or that a single level-1 cluster 42 may be lost, but the data must be recoverable from the remaining 75 IEs on the other level-1 clusters 42. To this end, the source nodes knows that it must distribute 25 IEs on each of the four level-1 clusters 42. The source node then proceeds through steps 128 and 136 in the middle of the flowchart (FIG. 5).

In accordance with step 128 (FIG. 5), the source node selects the LAN 32 to which it belongs, i.e., LAN 32(2). The source node determines that LAN 32(2) includes 30 storage nodes thus enabling the LAN 32(2) to hold all 25 IEs for cluster 42(A). The source node then proceeds to step 136 (FIG. 5).

In accordance with step 136, the source node screens particular candidate LANs 32 based on failure correlation metrics representing failure correlation between the LAN 32(2) and other candidate LANs. Along these lines, suppose that the source node determines that the failure correlation between LAN 32(2) and sibling LANs 32(1) and 32(3) is too high and thus eliminates LANs 32(1) and 32(3) from possible selection, i.e., failure correlation between the source LAN 32(2) and the LANs 32(1) and 32(3) exceeds a particular failure correlation threshold. However, since the source node needs to store IEs across four level-1 clusters 42 (i.e., at least three more level-1 clusters 42), further suppose that the source node allows all of the LANs 32 of the other level-1 clusters 42 to remain under consideration since the failure correlation between the source of the data and the particular candidate LAN is less than the particular failure correlation threshold.

Once the first pass through the flowchart is complete, the source node performs two more passes through the flowchart in order to apply the traffic optimization policy and the data redundancy policy. Suppose that application of the remaining two policies by the source node eliminates LANs 32(5), 32(6), and 32(8) leaving LANs 32(5), 32(7) and 32(9).

At this point, in step 134, the source node is ready to select nodes on which to place the IEs. In particular, the source node selects 25 storage nodes of the LAN 32(2), another 25 storage nodes of the LAN 32(4), another 25 storage nodes of the LAN 32(7), and another 25 storage nodes of the LAN 32(9). The results of the LAN selection process is illustrated by the thicker lines in FIG. 7.

In a manner similar to that described above in Example 1, once the source node has identified 100 storage nodes, the source node sends the 100 IEs to the 100 storage nodes to distribute the 100 IEs among the storage nodes of the electronic environment 20 (also see step 106 in FIG. 3). In particular, the source node places 25 IEs in the selected 25 storage nodes of each selected LAN 32. Furthermore, the source node stores the location of each of the 100 IEs placed within the 100 storage nodes in a metadata file, and distributes copies of that metadata file among multiple storage nodes within the electronic environment 20 as well.

Accordingly, the 100 IEs are intelligently stored within the electronic environment 20. In particular, the IEs were distributed with a preference towards data redundancy, namely, preventing data loss by placing IEs on LANs with low failure correlations among them. Accordingly, as mentioned above, up to N-K information elements can be lost without losing access to the data. In particular, the highly available metadata identifies the locations of all of the information elements and the data chunk may be fully recovered from any K information elements.

Further Details

As described above in connection with the examples of FIGS. 6 through 8, the storage nodes 22 are provisioned with a rich set of flexible data placement policies to accommodate different system requirements. In particular, the policies consider three dimensions: network latency, IO performance, and system reliability.

Furthermore, it should be understood that the metadata, which identifies the locations of the information elements, is robustly and reliably distributed within the electronic environment 20 to further enhance fault tolerance. For example, several copies of the metadata may be placed within a single LAN 32. As another example, several copies may be placed across LANs 32, and so on.

Additionally, it should be understood that the metadata files were described above as containing the actual locations of where the IEs are stored (e.g., a list of storage nodes 32). Alternatively, when storing IEs derived from a chunk of data, the metadata files store a chunk key (i.e., a result of hashing the chunk) and LAN locations (i.e., LANs within which the IEs are stored). In this alternative arrangement, the chunk key identifies starting point within a respective chain or series of nodes within each LAN within which to store IEs. Such an arrangement alleviates the need to store (and later update) actual node locations within the metadata files as nodes join and leave. Rather, when a node joins or leaves a particular LAN, other operations may take place in order to make updating the information in the metadata files unnecessary. For example, if a node joins or leaves the particular LAN thus changing the chain of nodes for that LAN, IEs can be migrated among the nodes within that LAN (if needed) so that the chunk key within the metadata file can still be used to properly locate the IEs stored within that LAN.

Furthermore, it should be understood that administrative rules may be incorporated into the system. As a result, data may be distributed across regions so that a customized level of reliability is achieved.

As mentioned above, an improved technique intelligently places data 50 among storage nodes 22 of a plurality of LANs 32. This technique is capable of selecting LANs 32 from a pool of candidate LANs 32 in accordance with different policies such as (i) a traffic optimization policy to optimize network traffic when storing the data 50, (ii) a network bandwidth utilization policy to utilize LANs 32 with high network bandwidth density when storing the data 50, and (iii) a data redundancy policy to store data 50 on LANs 32 with low failure correlations. Such operation enables an electronic environment 20 formed by the LANs 32 to accommodate different system requirements (e.g., network latency requirements, input/output performance requirements, system reliability requirements, etc.). Moreover, since data 50 is distributed among storage nodes 32 of a plurality of LANs 32, system capacity is able to grow (i.e., scale) as the electronic environment 20 grows without creation of a problematic bottleneck.

While various embodiments of the invention have been particularly shown and described, it will be understood by those skilled in the art that various changes in form and details may be made therein without departing from the spirit and scope of the invention as defined by the appended claims.

For example, it should be understood that the above-described policy-based intelligent data placement techniques are well suited for storing video data (e.g., large video files) captured by various video cameras distributed within the electronic environment 20. In this situation, processing of the video data is effectively distributed throughout the electronic environment. In particular, each source node locally encodes the video data, generates data fragments and erasure codes (collectively, IEs), determines placement for the IEs, and places the IEs. Such operation provides parallel processing and avoids bottlenecks. Furthermore, such operation allows easy scaling of the system without taxing a particular part of the system as would a centralized facility.

Additionally, it should be understood that information other than video data can be processed by the system. Such information may be any sort of data that may be of interest in managing on an enterprise scale with distributed LANs 32 and storage nodes 22 as in the electronic environment 20.

What is claimed is:

1. A method of storing data in an electronic environment, the method comprising:
    from a pool of candidate local area networks (LANs) of the electronic environment, selecting a plurality of LANs within which to store the data based on a set of policy priority levels assigned to the data;
    generating a set of information elements from the data; and
    placing the set of information elements on storage nodes of the plurality of LANs;
    wherein each LAN is a computer network which includes a set of storage nodes;
    wherein generating the set of information elements from the data includes:
        partitioning the data into K non-overlapping data fragments, each non-overlapping data fragment being different, and creating (N-K) erasure codes based on the data;
    wherein the K non-overlapping data fragments and the (N-K) erasure codes form N information elements;
    wherein the data is recoverable from any combination of K non overlapping data fragments and erasure codes of the N information elements; and
    wherein each of K, (N-K) and N is an integer.

2. A method as in claim 1 wherein selecting the plurality of LANs from the pool of candidate LANs includes:
    receiving, as the set of policy priority levels:
        (i) a traffic optimization priority setting which identifies a policy priority level for a traffic optimization policy to optimize network traffic when storing the data within the electronic environment,
        (ii) a network bandwidth utilization priority setting which identifies a policy priority level for a network bandwidth utilization policy to utilize LANs with high network bandwidth density when storing the data within the electronic environment, and
        (iii) a data redundancy priority setting which identifies a policy priority level for a data redundancy policy to store data on LANs with low failure correlations;
    forming a policy ranking among the traffic optimization policy, the network bandwidth utilization policy, and the data redundancy policy based on the traffic optimization priority setting, the network bandwidth utilization priority setting, and the data redundancy priority setting; and
    choosing LANS from the pool of candidate LANs in accordance with the policy ranking.

3. A method as in claim 2 wherein choosing the LANS from the pool of candidate LANs in accordance with the policy ranking includes:
    identifying a first group of candidate LANs from the pool of candidate LANs based on a first ranked policy in the policy ranking;
    identifying a second group of candidate LANs from the first group of candidate LANs based on a second ranked policy in the policy ranking; and
    identifying, as the LANs chosen from the pool of candidate LANs, a third group of candidate LANs from the second group of candidate LANs based on a third ranked policy in the policy ranking.

4. A method as in claim 3 wherein the traffic optimization policy is constructed and arranged to screen particular candidate LANs based on network latency metrics representing network latencies between a source of the data and the particular candidate LANs.

5. A method as in claim 4 wherein the electronic environment is an overlay network which clusters candidate LANs based on hop count distances; and
    wherein the traffic optimization policy, when screening the particular candidate LANs based on the network latency metrics representing the network latencies between the source of the data and the particular candidate LANs, is constructed and arranged to:
        eliminate a particular candidate LAN from possible selection when a network latency metric representing network latency between the source of the data and the particular candidate LAN exceeds a particular network latency threshold, and maintain the particular candidate LAN for possible selection when the network latency metric representing the network latency between the source of the data and the particular candidate LAN is less than the particular network latency threshold.

6. A method as in claim 3 wherein the network bandwidth utilization policy is constructed and arranged to screen particular candidate LANs based on network bandwidth density metrics representing network bandwidth between a source of the data and the particular candidate LANs.

7. A method as in claim 6 wherein the electronic environment is an overlay network which clusters candidate LANs based on hop count distances; and
wherein the network bandwidth utilization policy, when screening the particular candidate LANs based on the network bandwidth density metrics representing network bandwidth between the source of the data and the particular candidate LANs, is constructed and arranged to:
eliminate a particular candidate LAN from possible selection when a network bandwidth density metric representing network bandwidth between the source of the data and the particular candidate LAN is less than a particular network bandwidth density threshold, and maintain the particular candidate LAN for possible selection when the network bandwidth density metric representing the network bandwidth between the source of the data and the particular candidate LAN exceeds the particular network bandwidth density threshold.

8. A method as in claim 3 wherein the data redundancy policy is constructed and arranged to screen particular candidate LANs based on failure correlation metrics representing failure correlation between a source of the data and the particular candidate LANs.

9. A method as in claim 8 wherein the electronic environment is an overlay network which clusters candidate LANs based on hop count distances; and
wherein the data redundancy policy, when screening the particular candidate LANs based on the failure correlation metrics representing failure correlation between the source of the data and the particular candidate LANs, is constructed and arranged to:
eliminate a particular candidate LAN from possible selection when a failure correlation metric representing failure correlation between the source of the data and the particular candidate LAN exceeds a particular failure correlation threshold, and maintain the particular candidate LAN for possible selection when the failure correlation metric representing the failure correlation between the source of the data and the particular candidate LAN is less than the particular failure correlation threshold.

10. A method as in claim 1 wherein the pool of candidate LANs includes an ordered chain of LANs; and wherein selecting the plurality of LANs from the pool of candidate LANs includes:
performing a hash operation on at least a portion of the data to produce a hash result, and indexing a particular LAN among other LANs of the ordered chain of LANs based on the hash result to identify the particular LAN as a target LAN for the data.

11. A method as in claim 10, further comprising:
after the particular LAN is identified as the target LAN, identifying a subset of storage nodes of the particular LAN to store portions of the data.

12. A method of storing data in an electronic environment, the method comprising:
from a pool of candidate local area networks (LANs) of the electronic environment, selecting a plurality of LANs within which to store the data based on a set of policy priority levels assigned to the data;
generating a set of information elements from the data; and
placing the set of information elements on storage nodes of the plurality of LANs;
wherein generating the set of information elements from the data includes:
partitioning the data into K non-overlapping data fragments, each non-overlapping data fragment being different, and creating (N-K) erasure codes based on the data,
wherein the K non-overlapping data fragments and the (N-K) erasure codes form N information elements,
wherein the data is recoverable from any combination of K non overlapping data fragments and erasure codes of the N information elements; and
wherein each of K, (N-K) and N is an integer.

13. A method as in claim 12 wherein placing the set of information elements on storage nodes of the plurality of LANs includes:
storing exactly one of the N information elements on each storage node of the plurality of LANs.

14. A method as in claim 13 the data is encoded video information;
and wherein the K non-overlapping data fragments are portions of a video file which contained the encoded video information.

15. A method as in claim 12, further comprising:
storing copies of a metadata file among the plurality of LANs, the metadata file identifying the storage nodes of the plurality of LANs on which the N information elements are placed.

16. A method as in claim 15 wherein the electronic environment is an overlay network formed by clusters of LANs; and wherein storing the copies of a metadata file among the plurality of LANs includes:
saving at least one copy of the metadata file on a particular cluster of LANs when that particular cluster of LANs stores at least one of the N information elements.

17. An electronic device, comprising:
a network interface to connect to an electronic environment;
memory to cache data for storage in the electronic environment; and
a controller coupled to the network interface and the memory, the controller being constructed and arranged to:
select, from a pool of candidate local area networks (LANs) of the electronic environment, a plurality of LANs within which to store the data based on a set of policy priority levels assigned to the data,
generate a set of information elements from the data cached in the memory, and
place the set of information elements on storage nodes of the plurality of LANs through the network interface;
wherein the controller, when generating the set of information elements from the data, is constructed and arranged to:
partition the data into K non-overlapping data fragments and create (N-K) erasure codes based on the data;
wherein the K non-overlapping data fragments and the (N-K) erasure codes form N information elements;

wherein the data is recoverable from any combination of K non overlapping data fragments and erasure codes; and
wherein each of K, (N-K) and N is an integer.

18. An electronic device as in claim 15 wherein the controller, when selecting the plurality of LANs from the pool of candidate LANs, is constructed and arranged to:
receive, as the set of policy priority levels:
(i) a traffic optimization priority setting which identifies a policy priority level for a traffic optimization policy to optimize network traffic when storing the data within the electronic environment,
(ii) a network bandwidth utilization priority setting which identifies a policy priority level for a network bandwidth utilization policy to utilize LANs with high network bandwidth density when storing the data within the electronic environment, and
(iii) a data redundancy priority setting which identifies a policy priority level for a data redundancy policy to store data on LANs with low failure correlations;
form a policy ranking among the traffic optimization policy, the network bandwidth utilization policy, and the data redundancy policy based on the traffic optimization priority setting, the network bandwidth utilization priority setting, and the data redundancy priority setting; and
choose LANS from the pool of candidate LANs in accordance with the policy ranking.

19. An electronic device as in claim 18 wherein the controller, when choosing the LANS from the pool of candidate LANs in accordance with the policy ranking, is constructed and arranged to:
identify a first group of candidate LANs from the pool of candidate LANs based on a first ranked policy in the policy ranking;
identify a second group of candidate LANs from the first group of candidate LANs based on a second ranked policy in the policy ranking; and
identify, as the LANs chosen from the pool of candidate LANs, a third group of candidate LANs from the second group of candidate LANs based on a third ranked policy in the policy ranking.

20. A computer program product which includes a non-transitory computer readable medium storing a set of instructions that, when performed by a computerized device, causes the computerized device to perform a method of storing data in an electronic environment, the method comprising:
from a pool of candidate local area networks (LANs) of the electronic environment, selecting a plurality of LANs within which to store the data based on a set of policy priority levels assigned to the data;
generating a set of information elements from the data; and
placing the set of information elements on storage nodes of the plurality of LANs;
wherein generating the set of information elements from the data includes:
partitioning the data into K non-overlapping data fragments, each non-overlapping data fragment being different, and creating (N-K) erasure codes based on the data;
wherein the K non-overlapping data fragments and the (N-K) erasure codes form N information elements;
wherein the data is recoverable from any combination of K non overlapping data fragments and erasure codes of the N information elements; and
wherein each of K, (N-K) and N is an integer.

21. A computer program product as in claim 20 wherein selecting the plurality of LANs from the pool of candidate LANs includes:
receiving, as the set of policy priority levels:
(i) a traffic optimization priority setting which identifies a policy priority level for a traffic optimization policy to optimize network traffic when storing the data within the electronic environment,
(ii) a network bandwidth utilization priority setting which identifies a policy priority level for a network bandwidth utilization policy to utilize LANs with high network bandwidth density when storing the data within the electronic environment, and
(iii) a data redundancy priority setting which identifies a policy priority level for a data redundancy policy to store data on LANs with low failure correlations;
forming a policy ranking among the traffic optimization policy, the network bandwidth utilization policy, and the data redundancy policy based on the traffic optimization priority setting, the network bandwidth utilization priority setting, and the data redundancy priority setting; and
choosing LANS from the pool of candidate LANs in accordance with the policy ranking.

22. A computer program product as in claim 20 wherein the pool of candidate LANs includes an ordered chain of LANs; and wherein selecting the plurality of LANs within which to store the data includes:
performing a hash operation on at least a portion of the data to produce a hash result, and indexing a particular LAN among other LANs of the ordered chain of LANs based on the hash result to identify the particular LAN as a target LAN for the data.

* * * * *